United States Patent
Klaus et al.

(10) Patent No.: US 6,946,967 B2
(45) Date of Patent: Sep. 20, 2005

(54) PROTECTIVE DEVICE FOR AN ELECTRIC MOTOR WITH SENSOR AND EVALUATION UNIT

(75) Inventors: Maximilian Klaus, München (DE); Gerhard Matscheko, Starnberg (DE)

(73) Assignee: Siemens Aktiengesellschaft, München (DE)

(*) Notice: Subject to any disclaimer, the term of this patent is extended or adjusted under 35 U.S.C. 154(b) by 277 days.

(21) Appl. No.: 10/329,978

(22) Filed: Dec. 26, 2002

(65) Prior Publication Data

US 2003/0128006 A1 Jul. 10, 2003

(30) Foreign Application Priority Data

Dec. 27, 2001 (DE) .......................... 101 64 204

(51) Int. Cl.[7] .............. H02H 7/00; H02H 5/04; H02K 17/32; H02P 3/14; G01R 27/08
(52) U.S. Cl. .............. 340/662; 361/18; 361/22; 361/23; 361/24; 361/25; 361/26; 361/29; 318/362; 318/376; 324/483; 324/694; 324/689; 324/710

(58) Field of Search .............. 340/662; 361/18, 361/22–29; 318/362, 376; 324/483, 694, 689, 710

(56) References Cited

U.S. PATENT DOCUMENTS

| | | | | |
|---|---|---|---|---|
| 4,266,257 A | * | 5/1981 | Rudich, Jr. ............ | 361/27 |
| 5,548,464 A | * | 8/1996 | Manning ............... | 361/23 |
| 5,583,406 A | * | 12/1996 | Mutoh et al. .......... | 318/376 |
| 5,959,457 A | * | 9/1999 | Berberich ............. | 324/710 |
| 6,169,648 B1 | * | 1/2001 | Denvir et al. ......... | 361/25 |
| 6,501,200 B2 | * | 12/2002 | Engel et al. .......... | 310/68 R |

* cited by examiner

*Primary Examiner*—Jeffery Hofsass
*Assistant Examiner*—Lam Pham
(74) *Attorney, Agent, or Firm*—Henry M. Feiereisen

(57) ABSTRACT

A protective device includes a signal input intended for connection to a sensor, a signal output intended for connection to an evaluation unit, and an isolation element for galvanically separating the signal input from the signal output. The provision of the protective device prevents a transmission of overvoltages from the sensor to the evaluating unit.

13 Claims, 1 Drawing Sheet

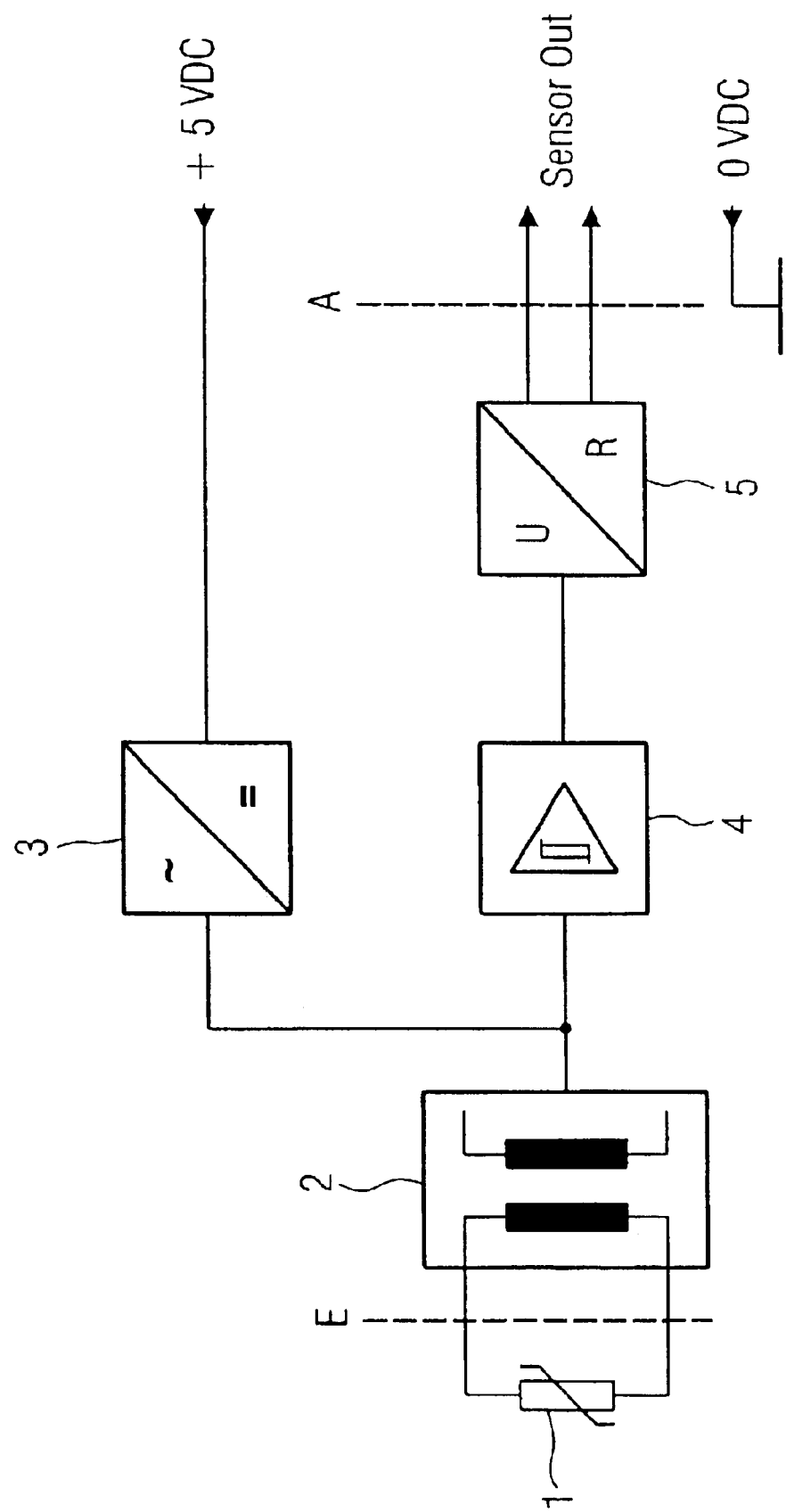

PROTECTIVE DEVICE FOR AN ELECTRIC MOTOR WITH SENSOR AND EVALUATION UNIT

CROSS-REFERENCES TO RELATED APPLICATIONS

This application claims the priority of German Patent Application, Serial No. 101 64 204.0, filed Dec. 27, 2001, pursuant to 35 U.S.C. 119(a)–(d), the disclosure of which is incorporated herein by reference.

BACKGROUND OF THE INVENTION

The present invention relates, in general, to a protective device, and more particularly to a protective device for, for example, an electric motor of a type having a main body, which carries windings, and at least one sensor, which is arranged as passive motor element upon a winding and outputs electric signals to an evaluation unit.

An example of a sensor includes a temperature sensor which is embedded in the windings and is monitored by an evaluation unit or transducer card to ascertain or prevent inadmissibly high temperatures. Operating voltages for the sensor or the transducer card are typically in the range of safety low voltages of about 5 V to 24 V. On the other hand, there are motors for machine tools which operate at voltages of about 600 V which may rise to 2000 V as a consequence of capacitive effects or oscillations. Thus, it becomes important already during normal operation to isolate the sensor from the windings. However, localized fire or a meltdown of the insulation may be encountered when the windings are short-circuited, so that the winding voltage may breakdown via the sensor to the evaluation unit or transducer card. Not only may this lead to a destruction of the involved components but there is also a risk to an operator in view of vagabond voltage that may reach the operating elements.

One proposal to prevent a voltage breakdown involves the use of stronger insulation for the sensor. This is disadvantageous because the sensor reacts very sluggishly to temperature fluctuations so that a rapid temperature increase cannot be detected with sufficient speed. Another approach involves the use of thermistor-type triggering devices for motor protection which cut, just like a relay, a connection between a sensor and an evaluation unit. As these devices are relatively bulky and typically operate at a voltage of 230 V, they are normally mounted in a switch cabinet or to the inverter of the motor.

It would be desirable and advantageous to provide an improved protective device which obviates prior art shortcomings and which is simple ands compact in structure and yet reliably protects evaluation units from overvoltages generated by the sensor.

SUMMARY OF THE INVENTION

According to one aspect of the present invention, a protective device includes a signal input intended for connection to a sensor, a signal output intended for connection to an evaluation unit, and an isolation element for galvanically separating the signal input from the signal output.

The present invention resolves prior art problems by providing an isolation element by which the sensor is galvanically isolated from the evaluation unit so as to eliminate a direct electric connection between the sensor and the evaluation unit. Thus, no overvoltages can be transmitted.

According to another feature of the present invention, the isolation element may be an isolation transformer having two windings, wherein one winding is connected to the signal input, and the other winding is connected to the signal output. In this way, the two windings are securely isolated from one another even at highest voltages to be expected. The sensor-side winding is so dimensioned as to consume only very little power and overvoltage of the sensor will not result in a damage of the insulation to the other winding. The isolation transformer may be constructed in a compact design and at a safe distance to the element to be monitored by the sensor, e.g. a motor winding.

According to another feature of the present invention, there may be provided an oscillator which is connected to one side of the transformer for input of a carrier frequency, whereas the other side of the transformer is connected to a sensor with variable resistance. The oscillator may be supplied with a safety low voltage, and may feed an alternating low voltage in a range from 5 to 24 V to the isolation transformer.

According to another feature of the present invention, the switching circuit of the protective device may include a switching stage and a voltage-to-resistance converter, so that a resistance is applied at the output, whereby the resistance suitably corresponds to the momentary resistance of the sensor. The switching stage and the voltage-to-resistance converter are disposed between the other winding of the insolating transformer and the signal output. In this way, already existing sensors and evaluation units may be used together with the protective device which suitably has thus a modular configuration.

According to another aspect of the present invention, a sensor assembly includes a sensor, an evaluation unit, and a protective device having a signal input for connection to the sensor, a signal output for connection to the evaluation unit, and an isolation element for galvanically isolating the signal input from the signal output, wherein the sensor is a temperature sensor. Suitably, the sensor has a linear characteristic or a switching characteristic. The evaluation unit monitors hereby a signal from the sensor and outputs a machine shutdown command, when the sensor signal indicates a hazardous level during a predetermined time interval or at two points in time which are separated by a predetermined time interval. In this way, a situation is avoided in which the sensor signal shuts down the machine each time there is a momentary fluctuation.

A protective device according to the present invention is especially useful in combination with a sensor assembly according to the present invention for monitoring the temperature of the winding body of an electric linear motor or rotary motor, whereby the sensor is embedded in the winding body.

BRIEF DESCRIPTION OF THE DRAWING

Other features and advantages of the present invention will be more readily apparent upon reading the following description of currently preferred exemplified embodiments of the invention with reference to the accompanying drawing, in which the sole FIG. 1 is a schematic circuit diagram of a protective device according to the present invention.

DETAILED DESCRIPTION OF PREFERRED EMBODIMENTS

The depicted embodiment is to be understood as illustrative of the invention and not as limiting in any way.

Turning now to FIG. 1, there is shown a schematic circuit diagram of a protective device according to the present invention for providing a protection from overvoltage generated by a sensor 1 which may be part of an electric motor, e.g., an electric linear motor or electric rotary motor. The protection device includes an isolation element such as an isolation transformer 2 having two windings, with one winding connected to a sensor 1, preferably a temperature-dependent resistor, and the other winding connected to an oscillator 3. Construction of such an isolation transformer is generally known to the artisan so that a detailed description thereof is omitted for the sake of simplicity.

The oscillator 3 is fed with a d.c. voltage of, for example, 5 volts and converts the d.c. voltage into an a.c. voltage with a carrier frequency.

When the resistance value of the sensor 1 changes, the switching characteristic of the system comprised of the sensor 1 and the isolation transformer 2 changes. The changed output signal is fed to a switching stage 4 for conversion into a voltage signal which is then converted by a voltage-to-resistance converter 5 to a resistance value. An evaluation unit (not shown) is constructed to query the resistance value. The voltage-to-resistance converter 5 converts hereby the voltage into a resistance value which corresponds to the actual resistance value of the sensor 1.

The protective device with its switching circuit comprised of isolation transformer 2, oscillator 3, switching stage 4 and voltage-to-resistance converter 5 can be simply integrated in the signal path between an already existent sensor and existent evaluation unit. In the case of a linear motor, the protective device can be mounted to the winding housing and may be united to a unitary structure in a casing, preferably as module.

A protective device according to the present invention is useful for monitoring the temperature in machines, e.g., electric motors. Especially suitable is its use for monitoring the temperature of the winding body of a linear motor, in view of the afore-described problems encountered during operation of the linear motor. Of course, a protective device according to the present invention may certainly also be used as temperature sensor for other types of sensors, in the event there is a risk of a voltage breakdown.

While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and their equivalents:

1. A protective device; comprising:
   a signal input intended for connection to a sensor;
   a signal output intended for connection to an evaluation unit; and
   an isolation transformer for galvanically isolating the signal input from the signal output, said isolation transformer having a first winding side, which is connected to the signal input, and a second winding side, which is connected to the signal output; and
   a switching stage and a voltage-to-resistance converter, which are disposed between the second winding side of the isolation transformer and the signal output.

2. The protective device of claim 1, and further comprising an oscillator connected to the second winding side.

3. The protective device of claim 2, wherein the oscillator is supplied with a safety low voltage.

4. The protective device of claim 2, wherein the oscillator feeds an alternating low voltage in a range from 5 to 24 V to the isolation transformer.

5. The protective device of claim 1 having a modular configuration.

6. The protective device of claim 2, wherein the sensor has variable resistance.

7. A sensor assembly, comprising:
   a sensor in the form of a temperature sensor;
   an evaluation unit;
   a protective device having a signal input intended for connection to the sensor, a signal output intended for connection to the evaluation unit, and an isolation transformer for galvanically isolating the signal input from the signal output, said isolation transformer having a first winding side, which is connected to the signal input, and a second winding side, which is connected to the signal output; and
   a switching stage and a voltage-to-resistance converter, which are disposed between the second winding side of the isolation transformer and the signal output.

8. The sensor assembly of claim 7, wherein the sensor has a linear characteristic.

9. The sensor assembly of claim 7, wherein the sensor has a switching characteristic.

10. The sensor assembly of claim 7, wherein the evaluation unit monitors a signal from the sensor and outputs a machine shutdown command when the sensor signal indicates a hazardous level during a predetermined time interval or at two points in time separated by a predetermined time interval.

11. An electric motor, comprising a sensor assembly including a temperature sensor, an evaluation unit, and a protective device having a signal input intended for connection to the temperature sensor, a signal output intended for connection to the evaluation unit, and an isolation transformer for galvanically isolating the signal input from the signal output, said isolation transformer having a first winding side, which is connected to the signal input, and a second winding side, which is connected to the signal output; and a switching stage and a voltage-to-resistance converter, which are disposed between the second winding side of the isolation transformer and the signal output.

12. The electric motor of claim 11 in the form of an electric linear motor.

13. The electric motor of claim 11 in the form of an electric rotary motor.

* * * * *